Feb. 3, 1925.
A. L. KNAPP ET AL
MOTOR VEHICLE
Filed Feb. 24, 1919
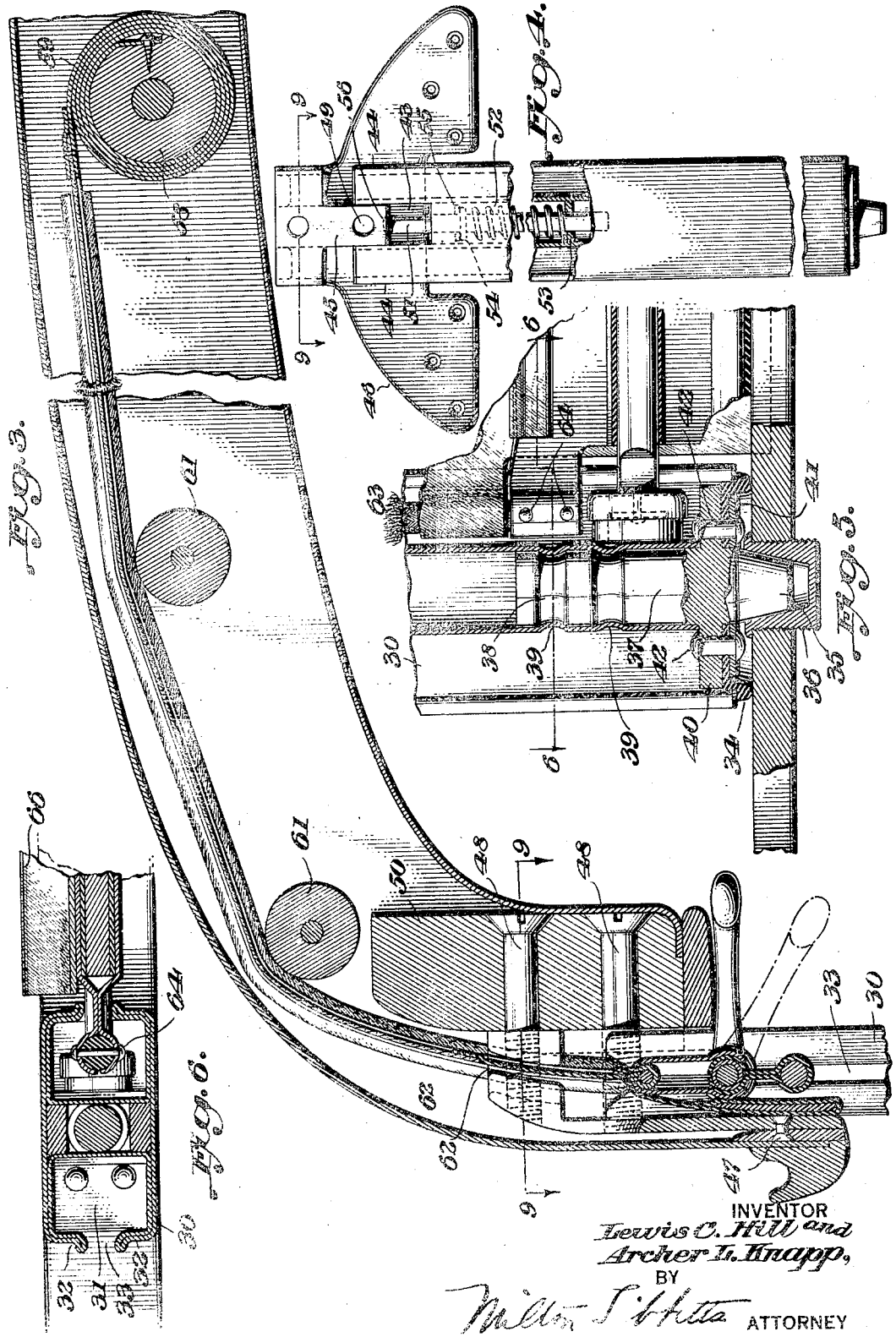

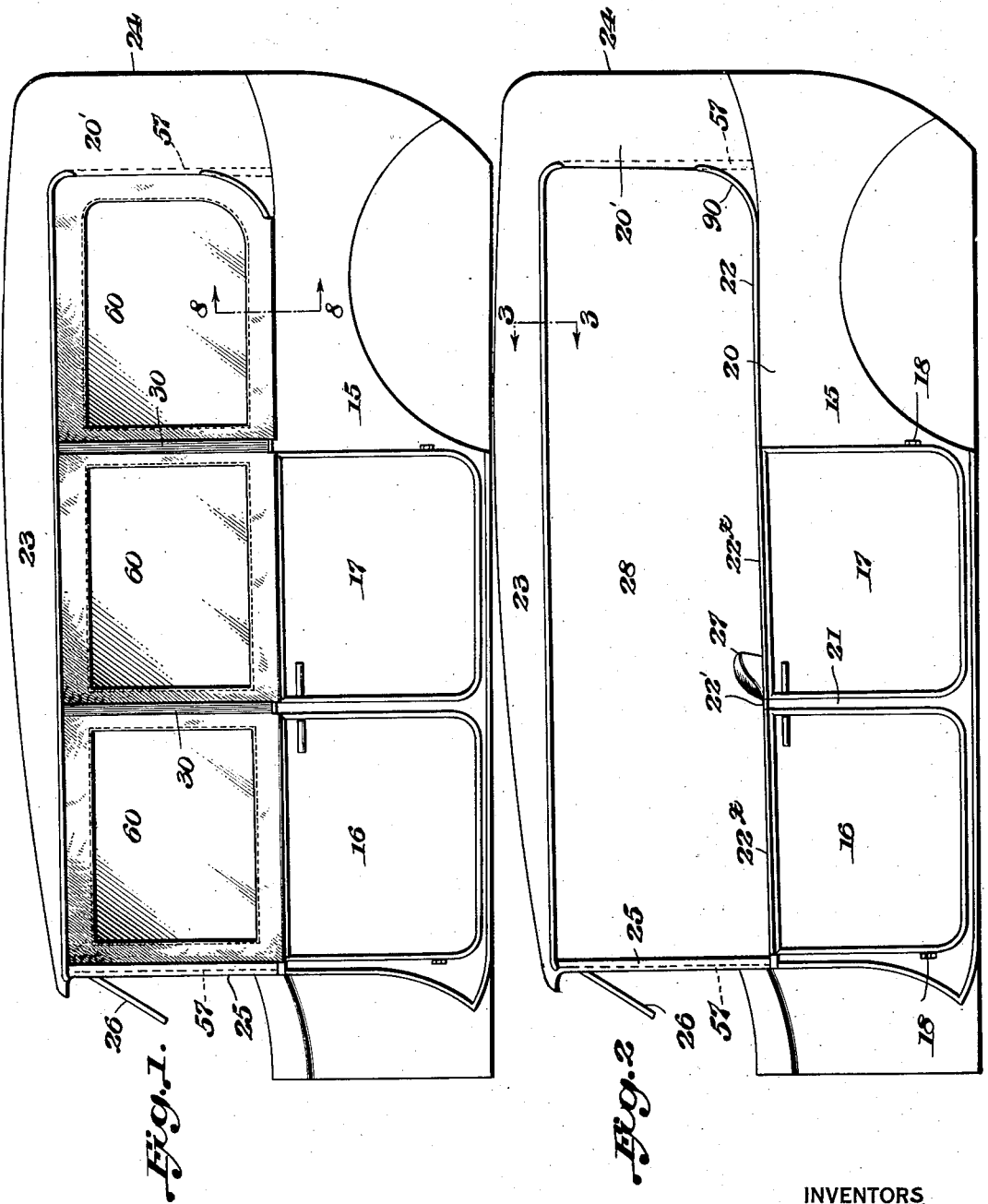

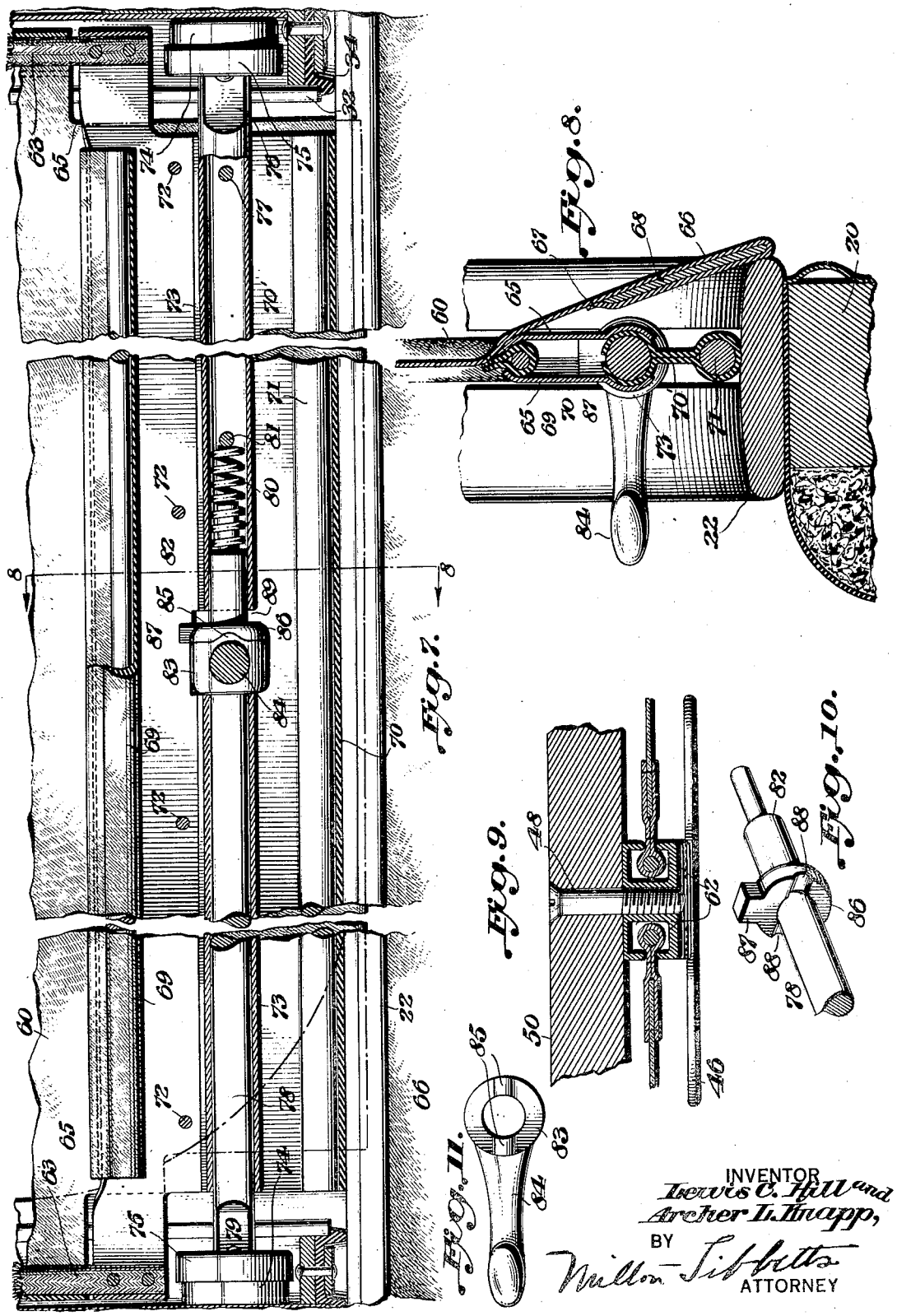

Patented Feb. 3, 1925.

1,524,736

UNITED STATES PATENT OFFICE.

ARCHER L. KNAPP AND LEWIS C. HILL, OF DETROIT, MICHIGAN, ASSIGNORS TO PACKARD MOTOR CAR COMPANY, OF DETROIT, MICHIGAN, A CORPORATION OF MICHIGAN.

MOTOR VEHICLE.

Application filed February 24, 1919. Serial No. 278,824.

*To all whom it may concern:*

Be it known that we, ARCHER L. KNAPP and LEWIS C. HILL, citizens of the United States, and residents of Detroit, Wayne County, State of Michigan, have invented certain new and useful Improvements in Motor Vehicles, of which the following is a specification.

This invention relates to motor vehicles, and more especially to convertible bodies for passenger vehicles. The principal object is to provide a passenger body capable of being converted from an open touring body to a closed body, and vice versa.

Another object of the invention is to provide roof supporting members which are readily detachable from the body and from the top.

Another object of the invention is to provide a construction whereby the wearing motion of the body will not affect the connection between the roof supporting member and the body and top.

The body is provided with a roof which is preferably mounted so as to be permanently and rigidly supported in position for use, the roof-supporting elements comprising permanently installed elements and detachable elements. The permanent elements are located at the front and rear of the seating compartment, and the detachable elements are located, when in use, at the sides of the body at intermediate points between the front and rear of the compartment.

The invention comprises, in addition to the elements heretofore named, a windshield and side curtains, the latter being mounted in the roof and arranged to be drawn downwardly from the rim of the latter to the rim or sill of the permanent side walls. The permanent element for supporting the roof at the rear of the body is preferably in the form of a rear wall extending entirely across the rear of the seating compartment. Although, as hereinbefore mentioned, the body is primarily an open touring body the rear portion of the side walls may extend upwardly to the roof, the said rear portions and the rear wall being preferably constructed as a unit and merged one into another without any defined demarcation. This structure leaves large openings in the sides of the body, which openings extend without interruption from the forward permanent roof-supporting elements to the aforesaid rear portions of the side walls, and afford unobstructed vision for the occupants of both the front and rear seats of the compartment.

The intermediate roof-supporting elements, which, for convenience, may be termed "stanchions," are preferably located with regard to the locations of the doorways. These stanchions, although having roof-supporting functions, serve also as guides for the side curtains, being provided with channels extending up and down to receive the side edges of the curtains. Similar channels are provided also in the rear faces of the forward permanent supports and in the front edges of the rear top extensions of the side walls. When the stanchions are in place, the curtains being up, the openings in the sides of the body are divided thereby into smaller openings each of which is provided with a side curtain.

The curtains and the elements with which they co-operate are organized to form substantially a weather-proof joint so that when the curtains are drawn down to the rim or sill of the body the occupants of the compartment will be protected against the natural elements. On the other hand, when the curtains are up and the side stanchions are detached, the body is, to all intents and purposes, an open touring body having a roof or top. Coupling devices are provided for coupling the upper and lower ends of the stanchions to the roof and sills respectively, and said devices enable the stanchions to be attached and detached in a few seconds so that the body may be converted quickly from one condition to the other.

Although it has been stated that an object of the invention is to convert a touring body to a closed body and vice versa such statement is not intended to limit the invention to a touring body, for it is apparent that a runabout body or other body having but one seat would be capable of embodying the invention.

Referring to the accompanying drawings Fig. 1 represents a side elevation of a touring body embodying the present invention, the detachable side stanchions being shown installed for use and the side curtains being drawn down to close the seating compartment.

Fig. 2 is a view similar to Fig. 1 excepting that the curtains are retracted from view and the side stanchions are removed.

Fig. 3 represents a sectional view on a larger scale, as indicated by line 3—3 of Fig. 2.

Figure 4 represents an elevation including the upper end portion of one of the detachable stanchions and the roof fixture that constitutes a coupling device for the stanchion.

Fig. 5 represents a view partly in vertical section and partly in elevation including the lower end of a detachable stanchion, a portion of the sill on which the stanchion rests, and a portion of one of the side curtains.

Fig. 6 represents a horizontal section through the structure intersected by line 6—6 of Fig. 5.

Fig. 7 represents a view partly in elevation and partly in section including the lower portion of a side curtain, the sill of the body, one of the detachable stanchions, and a permanent channel for the rear or left hand edge of the curtain. Intermediate portions of the structure are broken out to save space on the drawing.

Fig. 8 represents a vertical section including the lower portion of a curtain, an operating handle carried thereby and the sill of the body. See lines 8—8 of Figs. 1 and 7.

Fig. 9 represents a horizontal section through the coupling device at the upper end of the stanchion as indicated by lines 9—9 of Figs. 3 and 4.

Fig. 10 represents a perspective view of the middle portion of a plunger that is carried by the lower portion of the curtain to hold the latter at the desired position of adjustment.

The body 15 shown by the drawings is of the touring type, and includes front and rear doors 16 and 17 respectively. In this case the hinges 18 of the forward doors are at the front and those of the tonneau doors are at the rear. The upper hinges of the doors do not appear, being concealed within the structure but the lower hinges are arranged externally of the body because of the curve or undercut formation of the latter. The side wall of the body, indicated at 20, and the partition that forms the division between the doors is indicated at 21. The rim of the side wall is provided with a sill 22, and the partition 21 is provided with a relatively short sill section 22'. The doors are also provided with sill sections as indicated at 22ˣ. The sill elements 22, 22ˣ and 22', are to all intents and purposes a continuous sill when the doors are closed. A permanent roof is indicated at 23, the rear portion thereof being supported by extensions 20' of the side walls and by a permanent rear wall 24 that extends across the entire width of the body. In the process of construction, the roof, rear wall 24, and side wall extensions 20' may be organized as a unitary structure with the main part of the body, although the invention is not necessarily limited to such unitary construction. The forward end of the roof is supported by permanent pillars 25, one at each side, which pillars serve also to support the usual windshield a section of which is indicated at 26. The back of the front seat is indicated at 27, but the rear seats do not appear because they are entirely concealed by the side walls 20 and extensions 20'. Large side openings 28 are defined by the sills, at the bottom, by the roof, at the top, by the pillars 25, at the front, and by the extensions 20', at the rear. Each of these openings affords unobstructed vision for the occupants of the front seat and also for those in the tonneau, the body being for this reason desirable for travel in fair weather.

For the purpose of converting this body into a closed body for stormy weather six side curtains and four detachable stanchions are provided, the number of curtains and stanchions, however, being optional to some extent, and determined to some extent by the size and style of the body. The curtains are carried permanently by the roof and are arranged to be drawn downwardly from the latter to the sills of the side walls. In order, however, to guide the curtains and to hold them securely in position for use the detachable stanchions are adapted to be arranged to confine those edges of the curtains that extend up and down. According to the style shown there are two detachable stanchions 30 for each side of the body, one of them being arranged in vertical registration with the doorway partition 21, and the other being arranged in vertical registration with the rear edge of the rear doorway. The construction of the stanchions is shown by Figures 3 to 6 inclusive. In the present instance the stanchion is made of sheet metal suitably formed to provide undercut channels 31. The undercut formation is due to flanges 32, the free edges of the latter being separated by relatively narrow slots 33 through which the curtains may extend. The lower end of each stanchion is provided with a pad 34 of soft material such as rubber for contact with the sill. The function of the soft pad is to prevent any injury to the sill and to prevent rattling of the stanchion. The stanchion is also provided with a stud or dowel 35, the function of which is to hold the stanchion in the desired position relatively to the sill. Metallic socket members 36 are set into the sills to receive the dowels 35, and they are provided with external screw threads to hold them securely in the sills. The dowel is provided with a shank 37, the latter extending upwardly into the stanchion and being provided with annular grooves 38 to receive indented portions 39 of the stanchion. The formations 38 and 39 serve to locate the dowel in the stanchion. The dowel has a flange 40 that fits within the stanchion. One function of the flange is to provide a seat for the rubber pad 34. The pad is secured to the flange by a plate 41 and rivets 42.

The upper end of the stanchion is formed with a cleft 43 (see Fig. 4) and with two fingers or extensions 44. The cleft is provided to receive a boss 45 that is formed upon a plate 46. The plate is affixed to the rim of the roof by rivets 47 as shown by Fig. 3. The fingers 44 are arranged to straddle the boss 45 and to have sliding engagement with the latter, these elements forming a coupling by which the stanchion is held in the desired position relatively to the roof and relatively to the side curtains hereinafter described. The fixture 45, 46 is otherwise fastened to the roof structure by screws 48, the boss 45 being provided with internally screw threaded holes 49 to receive the screws. The latter are inserted through a bar 50 that constitutes one of the principal members of the roof frame. When the stanchion is coupled to the roof it is held against movement toward the front and rear by the boss 45, and is held against lateral movement by the plate 46 on the one side, and by the frame bar 50 on the other side.

In order to attach a stanchion the upper end is inserted between the plate 46 and bar 50 and is moved upwardly until the lower end of stud 35 is above the level of the top of the socket member 36, the coupling at the upper end of the stanchion being formed to permit the necessary upward movement of the stanchion the lower end of the stanchion is then moved to carry the stud 35 into the socket member 36, this movement involving a slight downward motion of the stanchion, but not enough to uncouple the stanchion from the fixture 45, 46. A spring plunger 51 is fitted into the upper end of the stanchion in position to bear upwardly against the boss 45 to keep the stanchion seated upon the lower sill so that there will not be liability of accidental detachment of the stanchion. The plunger 51 is surrounded by a coil compression spring 52, the lower end of said spring being seated upon a member 53 that is fixed in the stanchion. The upper end of the spring bears against a washer 54 that surrounds the plunger, and the washer in turn bears against a flange 55 that is carried by the plunger. The spring therefore maintains upper stress on the plunger, and the latter bears against the boss 45 and is seated in a shallow cavity 56 formed in the latter. The stanchion may be readily detached from the body by forcing it up against the pressure of the spring until the stud 35 clears the socket member.

When the stanchions are mounted in position for use they appear to be permanent parts of the body structure, their coupling at the top and bottom being entirely concealed, and no joints or gaps being visible to suggest the fact that they are detachable. The appearance of permanency is strengthened by their location in registration with the edges of the doorways, the front stanchions being of the same width as the doorway partitions 21, and being apparently continuations of said partitions. The width of the rear stanchions is preferably the same as that of the front stanchions for sake of uniformity, and the stanchions are interchangeable for this reason. The appearance of permanency as to the rear stanchions is strengthened by their locations in vertical registration with the rear edges of the rear doorways.

When there are two detachable stanchions and three side curtains at each side of the body the stanchions provide all the guiding and holding functions necessary for the middle curtain, also for the rear edge of the front curtain and for the front edge of the rear curtain. There remains, however, the necessity of providing similar guiding and holding means for the front edge of the front curtain and for the rear edge of the rear curtain. This necessity is taken care of by providing the permanent pillar 25 and the side wall extension 20' with permanent guides or channels 57.

The curtain construction is shown best by Figs. 3 and 8. The curtains in the present instance are of the roller type, the roof being provided with a spring-operated roller 58 for each curtain. No attempt has been made to show the construction of the curtain rolls because such construction is not of special importance for the purpose of describing this invention. It will be sufficient, for present purposes, to state that each roller is provided with a spring arranged to retract the curtain into the roof as shown by Fig. 3. The rollers 58 are arranged to extend substantially parallel to the length of the vehicle body, and are located near the longitudinal median line of the roof. The upper section 59 of each curtain, that is, the section that does not descend below the rim of the roof, is made of relatively thin flexible sheet material, one edge of which is permanently fastened to the roller. The lower section 60 of the curtain, that is, the section that descends below the rim of the roof may be made of thicker or less flexible sheet material, if desired, because it does not have to be rolled upon the roll 58. It may be stated at this point that the distance from the roll 58 to the rim of the roof is slightly greater than the distance from the rim of the roof to the sill 22, these proportions permitting a curtain section 60 that will extend from the sill to a point above the rim of the roof without requiring any portion of said section to be rolled upon the roll 58 when the lower edge of said section is raised above the level of the rim as shown by Fig. 3. The intermediate portion of the curtain between the winding roll 58 and the rim of the roof passes over idle rolls 61.

The front and rear edges of the curtains pass through channels 62 formed in the fixtures, 45, 46. These channels serve to guide the edges of the curtain to the channels 31 of the stanchions. The edges of the curtains are provided with thickness enlargements to prevent the curtains from being pulled out of the channels. These enlargements are preferably formed by wrapping the marginal portion of the curtains round flexible filling strips 63 of circular cross-section. These filler strips do not extend to the lower edge of the curtain, but are cut off a short distance, two inches more or less, from the bottom, and are fastened by rivets 64 to sheet metal strips 65 that extend across the curtain parallel to the lower edge. The lower marginal portion of the curtain hangs below the strips 65 to form a flap 66, and is turned back and stitched by a course of stitches 67 to form a pocket for the reception of a stiffening strip 68. The function of the flap 66 is to overhang the sill 22 as shown by Fig. 8, when the curtain is drawn down to its lowest position. In case of rain running down the outside of the curtain the flap 66 will shed the rain so that there will not be any opportunity for the rain to lodge upon the sill 22 or to enter the seating compartment. The stiffening strip 68 is preferably made of metal partly for strength and partly for weight, the flap being held against the outer edge of the sill with a slight pressure due to the weight of strip 68, thereby excluding wind to a considerable extent.

The connection between the curtain and and the metal strips 65 is formed in part by wale 69 that extends transversally of the curtain. This wale is stitched to the curtain, and is confined by and between the metal strips 65. The lower portions of strips 65 embrace a strip 70 of sheet rubber, and the latter, in turn, encloses a relatively stiff filling strip 71 of wood or other suitable material. The rubber strip 70 is doubled for this purpose, and provides a flexible web 70' between the strips 71 and the point of connection with the metal strips 65. This flexible web 70' is capable of being crumpled or flexed when the curtain is drawn down to its lowest position thereby enabling the rubber element, which is in fact a weather strip, to lie in close relation to the sill 22 the weather strip thus formed is effective to exclude whatever wind may enter between the flap 66 and the stanchion or other curtain guide. The metal strips 65 are connected one with the other at suitable intervals by rivets 72, and they form a rigid housing for a holding device by which the curtain may be held by any desired position of adjustment. The upper marginal portions of the rubber strip 70 embrace a metal tube 73, which, for a purpose hereinafter described, is made in two sections as shown by Fig. 7. The lower marginal portions of metal strips 65 are curved to conform to the cylindric shape of the tube, with allowance for the thickness of the rubber strip 70 that is interposed between the tube and the strips 65. When the latter strips are riveted together they clamp the rubber strip upon the tube with sufficient pressure to prevent the rubber strip from being accidentally detached.

Each curtain is provided with two friction shoes for engagement with the guiding channels in which the front and rear edges of the curtain slide. Each shoe comprises a ring 74 of suitable frictional material such as rubber, and an annular holder 75 for said ring. As shown by Fig. 7 the shoe at the right hand edge of the curtain is affixed to the outer end of the right hand section of tube 73, the tube being pressed or flattened at 76 to enable it to slide freely between the confining flanges 32 of the curtain guide. A rivet 77 extends through the tube and through the metal plates 65 to secure the tube rigidly to the plates. The friction shoe at the left hand edge of the curtain is carried by a plunger rod 78. This rod is reduced in thickness at 79 to enable it to slide freely between the confining flanges 32 of the curtain guide. Rod 78 extends through the left hand section of tube 73, and its right hand end extends into the right hand section of tube 73. A compression spring 80 is arranged in the latter section of tube 73 to move the friction shoes away from each other. One end of the spring is seated against a pin 81 carried by the tube and the other end of the spring bears against a shoulder 82 formed on the rod 78. The end portion of the rod is turned down to a smaller diameter and extends into the spring. Rod 78 extends loosely through the hub 83 of an operating handle 84. The hub is formed with cam portions 85 which bear against a collar 86, which collar is fixed upon the rod 78 and is provided with an ear 87 to keep it from turning. Grooves 88 are formed in the collar to receive the cam portions 85 as shown by Fig. 7. The opposite face of the hub bears against the end of the left hand tube section 73. When the operating handle is in the position shown by Fig. 7 the stress of spring 80 holds the friction shoes pressed against the bottoms of the curtain channels and the curtain is thus held by friction against the lifting tendency of the winding rolls 58. When the operating handle is turned about the axis of rod 78 the cam portions 85 displace the rod to the right relatively to the curtain, thereby shortening the distance between the traction faces of the friction shoes. The curtain is thus released so that it may be moved up or down. The operating handle is arranged to act as a lever to release the friction shoes from the curtain channels, upward movement of the handle being sufficient to release the curtain and move it upwardly, and downward movement of the handle being sufficient to release the curtain and move it downwardly. The metal plates 65 are provided with notches 89 to receive the hub 83 and collar 86, the width of the notches being limited to prevent displacement of the collar so far as to permit the cam portions 85 to move entirely out of the grooves 88. Whenever the operating handle is released if changing the position of the curtain, spring 80 reacts to return the handle to its median position and to press the friction shoes against the bottoms of the curtain channels.

Referring to Figs. 1 and 2 the lower rear corner of the opening 28 is curved as indicated at 90, and the corresponding corner of the rear curtain is curved accordingly. This curvature of the body is provided for an artistic purpose, and the corner of the curtain is curved to fit the curvature 90 so as to maintain a substantially weatherproof joint between the curtain and the body. The rear channel 57, however, is straight throughout, and is mortised into the side wall extension 20'. The front channel 57 is also mortised into its supporting element, namely, the permanent pillar 25.

When the curtains are up as far as they will go they are entirely concealed from view, so far as the external appearance is concerned, the rim of the roof extending downwardly a short distance as shown by Fig. 3, and the flap 66 of the curtain being raised far enough above the rim of the roof to avoid interrupting the contour of the opening 28 as defined by the roof.

Having thus described our invention, what we claim and desire to secure by Letters Patent is:

1. A vehicle body having open sides and comprising in combination, a roof, a curtain carried by and arranged to be drawn downwardly from said roof, a fixture carried by the roof and having a groove to receive and guide a side edge of said curtain, a detachable stanchion having a groove to receive and guide said side edge, said fixture having a vertical guide and said stanchion having its end portion slidably mounted thereon to permit vertical displacements of said stanchion while maintaining registration of said grooves, and means for normally holding the lower end of said stanchion in engagement with the side walls of the vehicle.

2. In combination with the roof and side walls of a motor vehicle, a member secured to the roof and having a vertical guide, the side wall having a socket in substantial vertical alignment with said guide, a stanchion having an upper end portion engaging said guide and having a stud at its lower end engaging said socket, said stanchion being vertically movable to the extent of permitting the stud to be withdrawn from the socket, and spring means resisting upward movement of said stanchion.

3. A vehicle body having open sides and comprising, in combination, a roof, a curtain carried by and arranged to be drawn downwardly from said roof, a fixture carried by the roof and having a groove to receive and guide a side edge of said curtain, a stanchion having a groove to receive and guide said side edge, said fixture having a vertical guide member and said stanchion having a bifurcated end straddling said member to maintain said grooves in registration and permit vertical displacement of said stanchion, the side wall of the vehicle having a socket in substantial vertical alignment with said guide member and the lower end of said stanchion having a stud engaged therein, and a spring pressed plunger carried by said stanchion and engaging the end face of said guide member.

4. A combination motor vehicle having a roof and side walls, a fixed member secured to said roof and having an outwardly projecting boss, a socket member secured to said side wall and a stanchion having a bifurcated portion engaging the boss of said fixed member and a stud engaging said socket member and resilient means for retaining said stanchion in engagement with said fixed member and said socket member.

In testimony whereof we affix our signatures.

ARCHER L. KNAPP.
LEWIS C. HILL.